(12) United States Patent
Kook et al.

(10) Patent No.: US 10,487,919 B2
(45) Date of Patent: Nov. 26, 2019

(54) PLANETARY GEAR TRAIN OF AUTOMATIC TRANSMISSION FOR VEHICLE

(71) Applicants: Hyundai Motor Company, Seoul (KR); Kia Motors Corporation, Seoul (KR)

(72) Inventors: Jae Chang Kook, Hwaseong-si (KR); Hyun Sik Kwon, Seoul (KR); Ki Tae Kim, Incheon (KR); Wonmin Cho, Hwaseong-si (KR); Seong Wook Hwang, Gunpo-si (KR); Seongwook Ji, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 111 days.

(21) Appl. No.: 15/816,683

(22) Filed: Nov. 17, 2017

(65) Prior Publication Data

US 2019/0120335 A1    Apr. 25, 2019

(30) Foreign Application Priority Data

Oct. 19, 2017    (KR) .......................... 10-2017-0135805

(51) Int. Cl.
*F16H 3/66*    (2006.01)
*F16H 3/44*    (2006.01)

(52) U.S. Cl.
CPC ......... *F16H 3/66* (2013.01); *F16H 2003/445* (2013.01); *F16H 2200/0069* (2013.01);
(Continued)

(58) Field of Classification Search
CPC ............... F16H 3/66; F16H 2200/0078; F16H 2200/2012; F16H 2200/0086;
(Continued)

(56) References Cited

U.S. PATENT DOCUMENTS 8,979,701 B2 *   3/2015   Baldwin ................... F16H 3/66
                                                       475/276
8,986,153 B2 *   3/2015   Park ........................ F16H 3/663
                                                       475/275
(Continued)

FOREIGN PATENT DOCUMENTS

DE    102012219408 A1 *  5/2013   ............... F16H 3/62

*Primary Examiner* — Justin Holmes
(74) *Attorney, Agent, or Firm* — Morgan, Lewis & Bockius LLP (57) ABSTRACT

A planetary gear train may include input and output shafts, first to fourth planetary gear sets respectively having first to third, fourth to sixth, seventh to ninth, and tenth to twelfth elements, a first shaft connected to the second element and selectively connectable to the input shaft, a second shaft connected to the fourth element, selectively connectable to the input shaft and a transmission housing, a third shaft connected to the fifth and ninth element, selectively connectable to the input shaft and the transmission housing, a fourth shaft connected to the third and eleventh elements and the output shaft, a fifth shaft connected to the first, sixth, eighth, and tenth elements, a sixth shaft connected to the seventh element, and a seventh shaft connected to the twelfth element and selectively connectable to the transmission housing.

18 Claims, 4 Drawing Sheets

(52) U.S. Cl.
CPC ............... *F16H 2200/0078* (2013.01); *F16H 2200/0086* (2013.01); *F16H 2200/2012* (2013.01); *F16H 2200/2048* (2013.01)

(58) Field of Classification Search
CPC ....... F16H 2200/0069; F16H 2003/445; F16H 2200/2048
See application file for complete search history.

(56) References Cited

U.S. PATENT DOCUMENTS

| | | | |
|---|---|---|---|
| 9,726,260 B1* | 8/2017 | Kook | F16H 3/66 |
| 10,234,026 B2* | 3/2019 | Tachibanada | F16H 61/12 |
| 2012/0270694 A1* | 10/2012 | Seo | F16H 3/66 |
| | | | 475/276 |
| 2014/0018204 A1* | 1/2014 | Mellet | F16D 25/06 |
| | | | 475/275 |
| 2016/0169341 A1* | 6/2016 | Cho | F16H 3/66 |
| | | | 475/277 |
| 2016/0169343 A1* | 6/2016 | Cho | F16H 3/66 |
| | | | 475/275 |
| 2016/0223055 A1 | 8/2016 | Beck et al. | |
| 2016/0245370 A1* | 8/2016 | Beck | F16H 3/66 |
| 2018/0223958 A1* | 8/2018 | Hoffman | F16H 3/66 |

\* cited by examiner

| Shift-stage | Engagement element | | | | | | | Gear ratio |
|---|---|---|---|---|---|---|---|---|
| | C1 | C2 | C3 | C4 | B1 | B2 | B3 | |
| D1 |  | ● |  | ● |  |  | ● | 5.967 |
| D2 |  | ● | ● |  |  |  | ● | 3.851 |
| D3 |  |  | ● | ● |  |  | ● | 2.853 |
| D4 |  |  | ● |  |  | ● | ● | 1.939 |
| D5 | ● |  |  |  |  | ● | ● | 1.519 |
| D6 | ● |  | ● |  |  | ● |  | 1.224 |
| D7 | ● | ● | ● |  |  |  |  | 1.000 |
| D8 | ● | ● |  |  | ● |  |  | 0.818 |
| D9 | ● |  |  |  | ● | ● |  | 0.720 |
| D10 | ● |  |  | ● | ● |  |  | 0.636 |
| REV |  |  |  | ● | ● |  | ● | -6.052 |

FIG. 3

| Shift-stage | Engagement element | | | | | | | Gear ratio |
|---|---|---|---|---|---|---|---|---|
| | C1 | C2 | C3 | C4 | B1 | B2 | B3 | |
| D1 |  | ● |  | ● |  |  | ● | 5.967 |
| D2 |  | ● | ● |  |  |  | ● | 3.851 |
| D3 |  |  | ● | ● |  |  | ● | 2.853 |
| D4 |  |  | ● |  |  | ● | ● | 1.939 |
| D5(1) | ● | ● |  |  |  |  | ● | 1.519 |
| D5(2) | ● |  | ● |  |  |  | ● | 1.519 |
| D5(3) | ● |  |  | ● |  |  | ● | 1.519 |
| D5(4) | ● |  |  |  | ● |  | ● | 1.519 |
| D5(5) | ● |  |  |  |  | ● | ● | 1.519 |
| D6 | ● |  | ● |  |  | ● |  | 1.224 |
| D7(1) | ● | ● |  | ● |  |  |  | 1.000 |
| D7(2) | ● | ● | ● |  |  |  |  | 1.000 |
| D7(3) | ● |  | ● | ● |  |  |  | 1.000 |
| D7(4) |  | ● | ● | ● |  |  |  | 1.000 |
| D8 | ● | ● |  |  |  | ● |  | 0.896 |
| D9 | ● | ● |  |  | ● |  |  | 0.818 |
| D10 | ● |  |  |  | ● | ● |  | 0.720 |
| D11 | ● |  |  | ● | ● |  |  | 0.636 |
| D12 |  | ● | ● |  |  | ● |  | 0.426 |
| REV1 |  |  |  | ● | ● |  | ● | -6.052 |
| REV2 |  | ● |  | ● | ● |  |  | -0.742 |

FIG. 4

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2017-0135805 filed on Oct. 19, 2017, the entire contents of which is incorporated herein for all purposes by this reference.

BACKGROUND OF THE INVENTION

Field of the Invention

The present invention relates to an automatic transmission for a vehicle.

Description of Related Art

Research on realizing more shift-stages of an automatic transmission are undertaken to achieve enhancement of fuel consumption and better drivability, and recently, increase of oil price is triggering a hard competition in enhancing fuel consumption of a vehicle.

In this sense, research on an engine has been undertaken to achieve weight reduction and to enhance fuel consumption by so-called downsizing research on an automatic transmission has been performed to simultaneously provide better drivability and fuel consumption by achieving more shift stages.

To achieve more shift stages for an automatic transmission, the number of parts is typically increased, which may deteriorate installability, production cost, weight and/or power flow efficiency.

Therefore, to maximally enhance fuel consumption of an automatic transmission having more shift stages, it is important for better efficiency to be derived by fewer number of parts.

In the present respect, an eight-speed automatic transmission has been recently introduced, and a planetary gear train for an automatic transmission facilitating more shift stages is under investigation.

An automatic transmission of eight or more shift-stages typically includes three to four planetary gear sets and five to seven engagement elements (frictional elements), and may easily become lengthy, thereby deteriorating installability.

In this regard, disposing planetary gear sets in parallel or employing dog clutches instead of wet-type control elements is sometimes attempted. However, such an arrangement may not be widely applicable, and using dog clutches may easily deteriorate shift-feel.

The information disclosed in the present Background of the Invention section is only for enhancement of understanding of the general background of the invention and may not be taken as an acknowledgement or any form of suggestion that the present information forms the prior art already known to a person skilled in the art.

BRIEF SUMMARY

Various aspects of the present invention are directed to providing a planetary gear train of an automatic transmission for a vehicle facilitating at least ten forward speeds, providing better performance and fuel efficiency of a vehicle.

A planetary gear train according to an exemplary embodiment of the present invention may include an input shaft receiving an engine torque, an output shaft outputting a shifted torque, a first planetary gear set having first, second and third rotation elements, a second planetary gear set having fourth, fifth, and sixth rotation elements, a third planetary gear set having seventh, eighth, and ninth rotation elements, and a fourth planetary gear set having tenth, eleventh, and twelfth rotation elements. An exemplary planetary gear train may further include a first shaft fixedly connected to the second rotation element and selectively connectable to the input shaft, a second shaft fixedly connected to the fourth rotation element, selectively connectable to the input shaft, and selectively connectable to the transmission housing, a third shaft fixedly connected to the fifth rotation element and the ninth rotation element, selectively connectable to the input shaft, and selectively connectable to the transmission housing, a fourth shaft fixedly connected to the third rotation element and the eleventh rotation element and fixedly connected to the output shaft, a fifth shaft fixedly connected to the first rotation element, the sixth rotation element, the eighth rotation element, and the tenth rotation element, a sixth shaft fixedly connected to the seventh rotation element, and a seventh shaft fixedly connected to the twelfth rotation element and selectively connectable to the transmission housing respectively.

The input shaft and the first shaft, the input shaft and the second shaft, the input shaft and the third shaft, and the fourth shaft and the sixth shaft may be selectively interconnected respectively.

The exemplary planetary gear train may further include four clutches each selectively connecting a corresponding pair among the input shaft, the output shaft, and the first to seventh shafts, and three brakes selectively connecting the second shaft, the third shaft, and the seventh shaft to the transmission housing respectively.

The four clutches may include a first clutch disposed between the input shaft and the first shaft, a second clutch disposed between the fourth shaft and the sixth shaft, a third clutch disposed between the input shaft and the third shaft, and a fourth clutch disposed between the input shaft and the second shaft. The three brakes may include a first brake disposed between the second shaft and the transmission housing, a first brake disposed between the third shaft and the transmission housing, and a second brake disposed between the seventh shaft and the transmission housing.

The first planetary gear set may be a single pinion planetary gear set having a first sun gear, a first planet carrier, and a first ring gear as the first, second and third rotation elements. The second planetary gear set may be a single pinion planetary gear set having a second sun gear, a second planet carrier, and a second ring gear as the fourth, fifth, and sixth rotation elements. The third planetary gear set may be a single pinion planetary gear set having a third sun gear, a third planet carrier, and a third ring gear as the seventh, eighth, and ninth rotation elements. The fourth planetary gear set may be a single pinion planetary gear set having a fourth sun gear, a fourth planet carrier, and a fourth ring gear as the tenth, eleventh, and twelfth rotation elements.

The first, second, third and fourth planetary gear sets may be disposed in the order of the second, third, fourth, and first planetary gear sets from an engine side.

According to an exemplary embodiment of the present invention, shift-stages of at least ten forward speeds and at least one reverse speed may be realized by combination of four planetary gear sets of simple planetary gear sets and seven engagement elements.

Furthermore, a planetary gear train according to an exemplary embodiment of the present invention may improve driving stability by realizing shift-stages appropriate for rotation speed of an engine due to multi-stages of an automatic transmission.

Furthermore, a planetary gear train according to an exemplary embodiment of the present invention may maximize engine driving efficiency by multi-stages of an automatic transmission, and may improve power delivery performance and fuel consumption.

Furthermore, effects that can be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in portion by the particualrily intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described more specifically with reference to drawings.

The drawings and description are to be regarded as illustrative in nature and not restrictive, and like reference numerals designate like elements throughout the specification.

In the following description, dividing names of components into first, second, and the like is to divide the names because the names of the components are the same as each other and an order thereof is not particularly limited.

Figure 1:
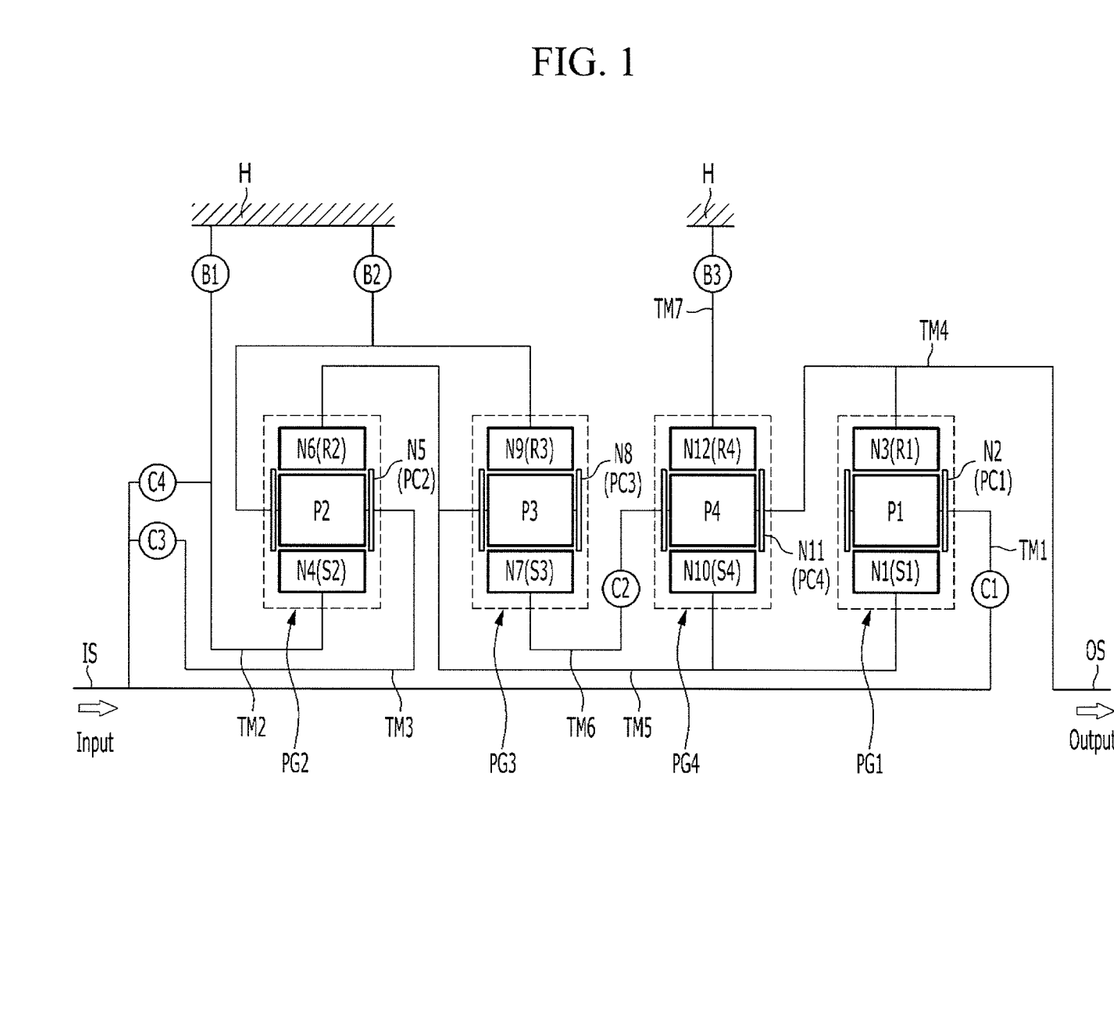
FIG. 1 is a schematic diagram of a planetary gear train according to various exemplary embodiments of the present invention.

FIG. 1 is a schematic diagram of a planetary gear train according to various exemplary embodiments of the present invention.

Referring to FIG. 1, a planetary gear train according to various exemplary embodiments of the present invention may include first, second, third and fourth planetary gear sets PG1, PG2, PG3, and PG4 disposed on a same axis, an input shaft IS, an output shaft OS, seven shafts TM1 to TM7 interconnecting rotation elements of the first, second, third and fourth planetary gear sets PG1, PG2, PG3, and PG4, engagement elements of four clutches C1 to C4 and three brakes B1 to B3, and a transmission housing H.

Torque input from the input shaft IS is shifted by cooperative operation of the first, second, third and fourth planetary gear sets PG1, PG2, PG3, and PG4, and then output through the output shaft OS.

In the various exemplary embodiments, the planetary gear sets are disposed in the order of the second, the third, and the fourth, first planetary gear set (PG2, PG3, PG4, PG1), from an engine side.

The input shaft IS is an input member and may receive a torque from a crankshaft of an engine through a torque converter.

The output shaft OS is an output element disposed on a same axis with the input shaft IS, and outputs a shifted driving torque to a driveshaft through a differential apparatus.

The first planetary gear set PG1 is a single pinion planetary gear set, and may include a first sun gear S1, a first planet carrier PC1 rotatably supporting a plurality of first pinion gears P1 externally gear-meshed with the first sun gear S1, and a first ring gear R1 internally gear-meshed with the plurality of first pinion gears P1 engaged with the first sun gear S1. The first sun gear S1 acts as a first rotation element N1, the first planet carrier PC1 acts as a second rotation element N2, and the first ring gear R1 acts as a third rotation element N3.

The second planetary gear set PG2 is a single pinion planetary gear set, and may include a second sun gear S2, a second planet carrier PC2 rotatably supporting a plurality of second pinion gears P2 externally gear-meshed with the second sun gear S2, and a second ring gear R2 internally gear-meshed with the plurality of second pinion gears P2 engaged with the second sun gear S2. The second sun gear S2 acts as a fourth rotation element N4, the second planet carrier PC2 acts as a fifth rotation element N5, and the second ring gear R2 acts as a sixth rotation element N6.

The third planetary gear set PG3 is a single pinion planetary gear set, and may include a third sun gear S3, a third planet carrier PC3 rotatably supporting a plurality of third pinion gears P3 externally gear-meshed with the third sun gear S3, and a third ring gear R3 internally gear-meshed with the plurality of third pinion gears P3 engaged with the third sun gear S3. The third sun gear S3 acts as a seventh rotation element N7, the third planet carrier PC3 acts as an eighth rotation element N8, and the third ring gear R3 acts as a ninth rotation element N9.

The fourth planetary gear set PG4 is a single pinion planetary gear set, and may include a fourth sun gear S4, a fourth planet carrier PC4 rotatably supporting a plurality of fourth pinion gears P4 externally gear-meshed with the fourth sun gear S4, and a fourth ring gear R4 internally gear-meshed with the plurality of fourth pinion gears P4 engaged with the fourth sun gear S4. The fourth sun gear S4 acts as a tenth rotation element N10, the fourth planet carrier PC4 acts as an eleventh rotation element N11, and the fourth ring gear R4 acts as a twelfth rotation element N12.

In the first, second, third and fourth planetary gear sets PG1, PG2, PG3, and PG4, the first rotation element N1 is fixedly connected to the sixth rotation element N6, the eighth rotation element N8, and the tenth rotation element N10, the third rotation element N3 is fixedly connected to the eleventh rotation element N11, the fifth rotation element N5 fixedly connected to the ninth rotation element N9, and seven shafts TM1 to TM7 are formed.

The seven shafts TM1 to TM7 are hereinafter described more specifically.

The first shaft TM1 is fixedly connected to the second rotation element N2 (first planet carrier PC1), and selectively connectable to the input shaft IS selectively acting as an input element.

The second shaft TM2 is fixedly connected to the fourth rotation element N4 (second sun gear S2).

The third shaft TM3 is fixedly connected to fifth rotation element N5 (second planet carrier PC2) and ninth rotation element N9 (third ring gear R3), and selectively connectable to the input shaft IS selectively acting as an input element.

The fourth shaft TM4 is fixedly connected to third rotation element N3 (first ring gear R1) and eleventh rotation element N11 (fourth planet carrier PC4), and fixedly connected to the output shaft OS constantly acting as an output element.

The fifth shaft TM5 is fixedly connected to the first rotation element N1 (first sun gear S1), the sixth rotation element N6 (second ring gear R2), the eighth rotation element N8 (third planet carrier PC3), and the tenth rotation element N10 (fourth sun gear S4).

The sixth shaft TM6 is fixedly connected to the seventh rotation element N7 (third sun gear S3).

The seventh shaft TM7 is fixedly connected to the twelfth rotation element N12 (fourth ring gear R4).

Each of the seven shafts TM1 to TM7 may be a rotation member that fixedly interconnects the input and output shafts and rotation elements of the planetary gear sets PG1, PG2, PG3, and PG4, or may be a rotation member that selectively interconnects a rotation element to the transmission housing H, or may be a fixed member fixed to the transmission housing H.

In the disclosure, when two or more members are described to be "fixedly connected", where the member may be any of a shaft, an input shaft, an output shaft, a rotation member, and a transmission housing, it means that the fixedly connected members constantly rotate at a same speed.

When two or more members are described to be "selectively connectable" by an engagement element, it means that the selectively connectable members rotates separately when the engagement element is not engaged, and rotates at a same speed when the engagement element is engaged. It may be understood that in the case that a member is "selectively connectable" with a transmission housing by an engagement element, the member may be stationary when the engagement element is engaged.

The first shaft TM1, the second shaft TM2, and third shaft TM3 are selectively connectable to the input shaft IS respectively, and the fourth shaft TM4 is selectively connectable to the sixth shaft TM6.

The second shaft TM2, the third shaft TM3, and the seventh shaft TM7 are selectively connectable to the transmission housing H, selectively acting as fixed elements respectively.

The engagement elements of four clutches C1, C2, C3, and C4 are disposed between the seven shafts TM1 to TM7, the input shaft IS, and the output shaft OS, to form selective connections.

The seven shafts TM1 to TM7 may be selectively connectable to the transmission housing H, by control elements of three brakes B1, B2, and B3.

The seven engagement elements of the four clutches C1 to C4 and the three brakes B1 to B3 are disposed as follows.

The first clutch C1 is disposed between the input shaft IS and the first shaft TM1, and selectively connects the input shaft IS and the first shaft TM1, controlling power delivery therebetween.

The second clutch C2 is disposed between the fourth shaft TM4 and the sixth shaft TM6, and selectively connects the fourth shaft TM4 and the sixth shaft TM6, controlling power delivery therebetween.

The third clutch C3 is disposed between the input shaft IS and the third shaft TM3, and selectively connects the input shaft IS and the third shaft TM3, controlling power delivery therebetween.

The fourth clutch C4 is disposed between the input shaft IS and the second shaft TM2, and selectively connects the input shaft IS and the second shaft TM2, controlling power delivery therebetween.

The first brake B1 is disposed between the second shaft TM2 and the transmission housing H, and selectively connects the second shaft TM2 to the transmission housing H.

The second brake B2 is disposed between the third shaft TM3 and the transmission housing H, and selectively connects the third shaft TM3 to the transmission housing H.

The third brake B3 is disposed between the seventh shaft TM7 and the transmission housing H, and selectively connects the seventh shaft TM7 to the transmission housing H.

The engagement elements of the first, second, third and fourth clutches C1, C2, C3, and C4 and the first, second and third brakes B1, B2, and B3 may be realized as multi-plate hydraulic pressure friction devices that are frictionally engaged by hydraulic pressure, however, it may not be understood to be limited thereto, since various other configuration that are electrically controllable may be available.

Figure 2:
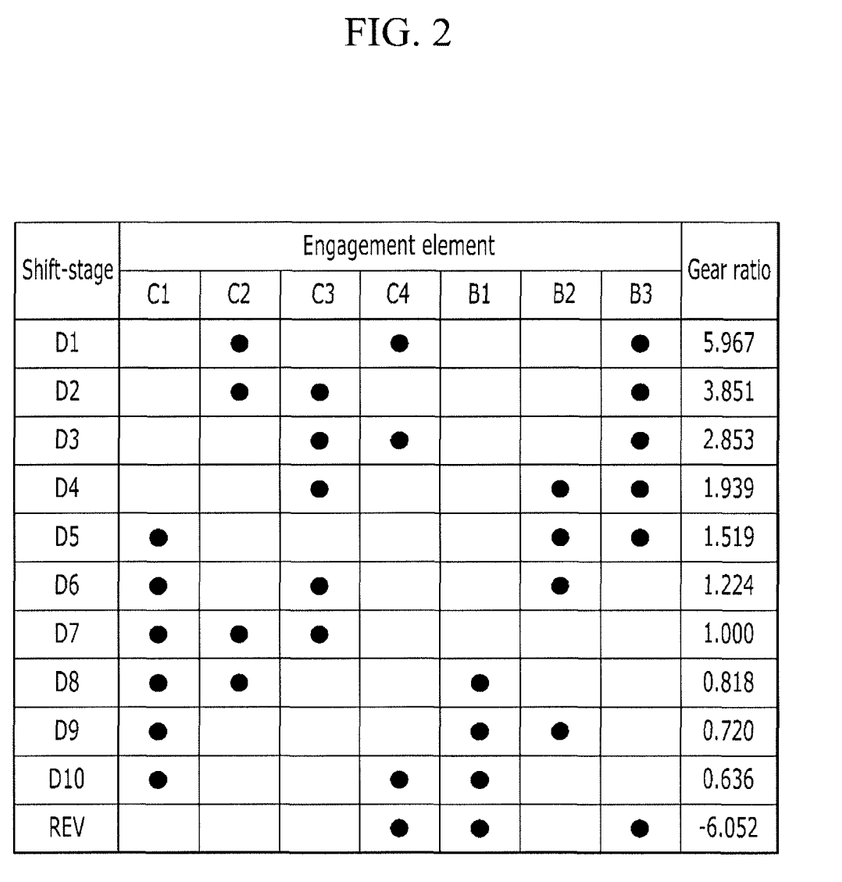
FIG. 2 is an operational chart for respective control elements at respective shift-stages applicable to a planetary gear train according to various exemplary embodiments of the present invention.

FIG. 2 is an operational chart for respective control elements at respective shift-stages applicable to a planetary gear train according to various exemplary embodiments of the present invention.

Referring to FIG. 2, a planetary gear train according to various exemplary embodiments of the present invention realizes shifting between ten forward speeds and one reverse speed by operating three elements among the engagement elements of the first, second, third and fourth clutches C1, C2, C3, and C4 and the first, second and third brakes B1, B2, and B3.

In the first forward speed D1, the second and fourth clutches C2 and C4 and the third brake B3 are simultaneously operated.

As a result, the fourth shaft TM4 and the sixth shaft TM6 are connected by the operation of the second clutch C2, and the input shaft IS and the second shaft TM2 are connected by the operation of the fourth clutch C4. In the present state, a torque is input to the second shaft TM2.

In such a state, the seventh shaft TM7 acts as a fixed element by the operation of the third brake B3, realizing the first forward speed and outputting a shifted torque to the output shaft OS connected to the fourth shaft TM4.

In the second forward speed D2, the second and third clutches C2 and C3 and the third brake B3 are simultaneously operated.

As a result, the fourth shaft TM4 and the sixth shaft TM6 are connected by the operation of the second clutch C2, and the input shaft IS and the third shaft TM3 are connected by the operation of the third clutch C3. In the present state, a torque is input to the third shaft TM3.

In such a state, the seventh shaft TM7 acts as a fixed element by the operation of the third brake B3, realizing the second forward speed and outputting a shifted torque to the output shaft OS connected to the fourth shaft TM4.

In the third forward speed D3, the third and fourth clutches C3 and C4 and the third brake B3 are simultaneously operated.

As a result, the input shaft IS and the third shaft TM3 are connected by the operation of the third clutch C3, and the input shaft IS and the second shaft TM2 are connected by the operation of the fourth clutch C4. In the present state, a torque is input to the second and third shafts TM2 and TM3.

In such a state, the seventh shaft TM7 acts as a fixed element by the operation of the third brake B3, realizing the third forward speed and outputting a shifted torque to the output shaft OS connected to the fourth shaft TM4.

In the fourth forward speed D4, the third clutch C3 and the second and third brakes B2 and B3 are simultaneously operated.

As a result, the input shaft IS and the third shaft TM3 are connected by the operation of the third clutch C3, and a torque is input to the third shaft TM3.

In the above state, the third and seventh shafts TM3 and TM7 act as fixed elements by the operation of the second and third brakes B2 and B3, realizing the fourth forward speed and outputting a shifted torque to the output shaft OS connected to the fourth shaft TM4.

In the fifth forward speed D5, the first clutch C1 and the second and third brakes B2 and B3 are simultaneously operated.

As a result, the input shaft IS and the first shaft TM1 are connected by the operation of the first clutch C1. In the present state, a torque is input to the first shaft TM1.

In the above state, the third and seventh shafts TM3 and TM7 act as fixed elements by the operation of the second and third brakes B2 and B3, realizing the fifth forward speed and outputting a shifted torque to the output shaft OS connected to the fourth shaft TM4.

In the forward sixth forward speed D6, the first and third clutches C1 and C3 and the second brake B2 are simultaneously operated.

As a result, the input shaft IS and the first shaft TM1 are connected by the operation of the first clutch C1, and the input shaft IS and the third shaft TM3 are connected by the operation of the third clutch C3. In the present state, a torque is input to the first and third shafts TM1 and TM3.

In such a state, the third shaft TM3 acts as a fixed element by the operation of the second brake B2, realizing the forward sixth forward speed and outputting a shifted torque to the output shaft OS connected to the fourth shaft TM4.

In the seventh forward speed D7, the first, second and third clutches C1, C2, and C3 are simultaneously operated.

As a result, the input shaft IS and the first shaft TM1 are connected by the operation of the first clutch C1, the fourth shaft TM4 and the sixth shaft TM6 are connected by the operation of the second clutch C2, and the input shaft IS and the third shaft TM3 are connected by the operation of the third clutch C3.

As such, the first, second, third and fourth planetary gear sets PG1, PG2, PG3, and PG4 integrally rotate, and a torque is input to the first shaft TM1 and third shaft TM3, realizing the seventh forward speed where a torque is output as inputted, and outputting a shifted torque to the output shaft OS connected to the fourth shaft TM4.

In the eighth forward speed D8, the first and second clutch C1 and C2 and the first brake B1 are simultaneously operated.

As a result, the input shaft IS and the first shaft TM1 are connected by the operation of the first clutch C1, the fourth shaft TM4 and the sixth shaft TM6 are connected by the operation of the second clutch C2. In the present state, a torque is input to the first shaft TM1.

In such a state, the second shaft TM2 acts as a fixed element by the operation of the first brake B1, realizing the eighth forward speed and outputting a shifted torque to the output shaft OS connected to the fourth shaft TM4.

In the ninth forward speed D9, the first clutch C1 and the first and second brakes B1 and B2 are simultaneously operated.

As a result, the input shaft IS and the first shaft TM1 are connected by the operation of the first clutch C1. In the present state, a torque is input to the first shaft TM1.

In the above state, the second and third shafts TM2 and TM3 act as fixed elements by the operation of the first and second brakes B1 and B2, realizing the ninth forward speed and outputting a shifted torque to the output shaft OS connected to the fourth shaft TM4.

In the forward tenth speed D10, the first and fourth clutches C1 and C4 and the first brake B1 are simultaneously operated.

As a result, the input shaft IS and the first shaft TM1 are connected by the operation of the first clutch C1, and the input shaft IS and the second shaft TM2 are connected by the operation of the fourth clutch C4. In the present state, a torque is input to the first and second shafts TM1 and TM2.

In such a state, the second shaft TM2 acts as a fixed element by the operation of the first brake B1, realizing the forward tenth speed and outputting a shifted torque to the output shaft OS connected to the fourth shaft TM4.

In the reverse speed REV, the fourth clutch C4 and the first and third brakes B1 and B3 are simultaneously operated.

As a result, the input shaft IS and the second shaft TM2 are connected by the operation of the fourth clutch C4. In the present state, a torque is input to the second shaft TM2.

In the above state, the second and seventh shafts TM2 and TM7 act as fixed elements by the operation of the first and third brakes B1 and B3, realizing the reverse speed and outputting a reverse torque through the output shaft OS connected to the fourth shaft TM4.

Figure 3:
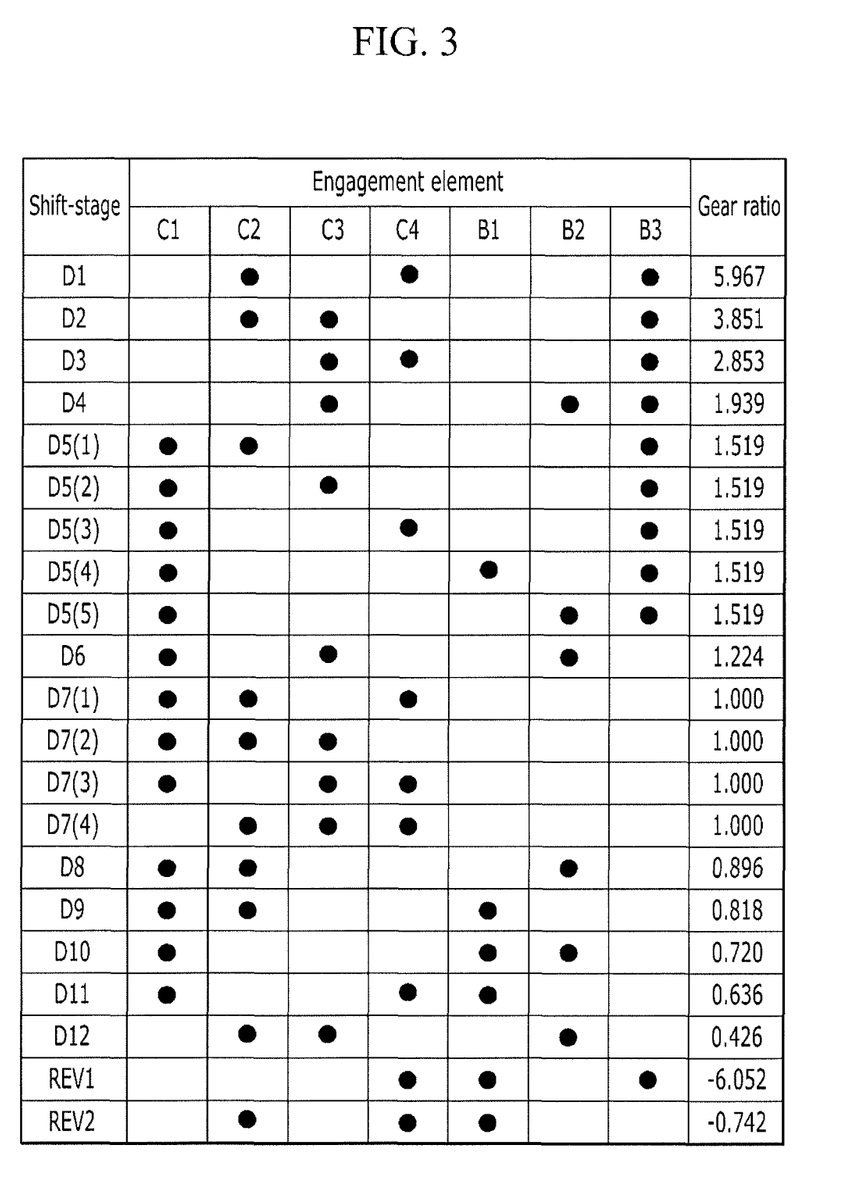
FIG. 3 is an operational chart for respective control elements at respective shift-stages applicable to a planetary gear train according to another exemplary embodiment of the present invention.

FIG. 3 is an operational chart for respective control elements at respective shift-stages applicable to a planetary gear train according to another exemplary embodiment of the present invention.

Referring to FIG. 3, a planetary gear train according to various exemplary embodiments of the present invention realizes shifting between twelve forward speeds and one reverse speed by operating three elements among the engagement elements of the first, second, third and fourth clutches C1, C2, C3, and C4 and the first, second and third brakes B1, B2, and B3.

In the first forward speed D1, the second and fourth clutches C2 and C4 and the third brake B3 are simultaneously operated.

As a result, the fourth shaft TM4 and the sixth shaft TM6 are connected by the operation of the second clutch C2, and the input shaft IS and the second shaft TM2 are connected by the operation of the fourth clutch C4. In the present state, a torque is input to the second shaft TM2.

In such a state, the seventh shaft TM7 acts as a fixed element by the operation of the third brake B3, realizing the first forward speed and outputting a shifted torque to the output shaft OS connected to the fourth shaft TM4.

In the second forward speed D2, the second and third clutches C2 and C3 and the third brake B3 are simultaneously operated.

As a result, the fourth shaft TM4 and the sixth shaft TM6 are connected by the operation of the second clutch C2, and the input shaft IS and the third shaft TM3 are connected by the operation of the third clutch C3. In the present state, a torque is input to the third shaft TM3.

In such a state, the seventh shaft TM7 acts as a fixed element by the operation of the third brake B3, realizing the second forward speed and outputting a shifted torque to the output shaft OS connected to the fourth shaft TM4.

In the third forward speed D3, the third and fourth clutches C3 and C4 and the third brake B3 are simultaneously operated.

As a result, the input shaft IS and the third shaft TM3 are connected by the operation of the third clutch C3, and the input shaft IS and the second shaft TM2 are connected by the operation of the fourth clutch C4. In the present state, a torque is input to the second and third shafts TM2 and TM3.

In such a state, the seventh shaft TM7 acts as a fixed element by the operation of the third brake B3, realizing the third forward speed and outputting a shifted torque to the output shaft OS connected to the fourth shaft TM4.

In the fourth forward speed D4, the third clutch C3 and the second and third brakes B2 and B3 are simultaneously operated.

As a result, the input shaft IS and the third shaft TM3 are connected by the operation of the third clutch C3. In the present state, a torque is input to the third shaft TM3.

In the above state, the third and seventh shafts TM3 and TM7 act as fixed elements by the operation of the second and third brakes B2 and B3, realizing the fourth forward speed and outputting a shifted torque to the output shaft OS connected to the fourth shaft TM4.

The fifth forward speed D5 may be realized with a same gear ratio by five schemes.

In the first scheme of the fifth forward speed D5(1), the first and second clutch C1 and C2 and the third brake B3 are simultaneously operated.

As a result, the input shaft IS and the first shaft TM1 are connected by the operation of the first clutch C1, and the fourth shaft TM4 and the sixth shaft TM6 are connected by the operation of the second clutch C2. In the present state, a torque is input to the first shaft TM1.

In such a state, the seventh shaft TM7 acts as a fixed element by the operation of the third brake B3, realizing the fifth forward speed and outputting a shifted torque to the output shaft OS connected to the fourth shaft TM4.

In the second scheme of the fifth forward speed D5(2), the first and third clutches C1 and C3 and the third brake B3 are simultaneously operated.

As a result, the input shaft IS and the first shaft TM1 are connected by the operation of the first clutch C1, and the input shaft IS and the third shaft TM3 are connected by the operation of the third clutch C3. In the present state, a torque is input to the first and third shafts TM1 and TM3.

In such a state, the seventh shaft TM7 acts as a fixed element by the operation of the third brake B3, realizing the fifth forward speed and outputting a shifted torque to the output shaft OS connected to the fourth shaft TM4.

In the third scheme of the fifth forward speed D5(3), the first and fourth clutches C1 and C4 and the third brake B3 are simultaneously operated.

As a result, the input shaft IS and the first shaft TM1 are connected by the operation of the first clutch C1, and the input shaft IS and the second shaft TM2 are connected by the operation of the fourth clutch C4. In the present state, a torque is input to the first and second shafts TM1 and TM2.

In such a state, the seventh shaft TM7 acts as a fixed element by the operation of the third brake B3, realizing the fifth forward speed and outputting a shifted torque to the output shaft OS connected to the fourth shaft TM4.

In the fourth scheme of the fifth forward speed D5(4), the first clutch C1 and the first and third brakes B1 and B3 are simultaneously operated.

As a result, the input shaft IS and the first shaft TM1 are connected by the operation of the first clutch C1. In the present state, a torque is input to the first shaft TM1.

In the above state, the second and seventh shafts TM2 and TM7 act as fixed elements by the operation of the first and third brakes B1 and B3, realizing the fifth forward speed and outputting a shifted torque to the output shaft OS connected to the fourth shaft TM4.

In the fifth scheme of the fifth forward speed D5(5), the first clutch C1 and the second and third brakes B2 and B3 are simultaneously operated.

As a result, the input shaft IS and the first shaft TM1 are connected by the operation of the first clutch C1. In the present state, a torque is input to the first shaft TM1.

In the above state, the third and seventh shaft TM3 and TM7 act as fixed elements by the operation of the second and third brakes B2 and B3, realizing the fifth forward speed and outputting a shifted torque to the output shaft OS connected to the fourth shaft TM4.

In the forward sixth forward speed D6, the first and third clutches C1 and C3 and the second brake B2 are simultaneously operated.

As a result, the input shaft IS and the first shaft TM1 are connected by the operation of the first clutch C1, and the input shaft IS and the third shaft TM3 are connected by the operation of the third clutch C3. In the present state, a torque is input to the first and third shafts TM1 and TM3.

In such a state, the third shaft TM3 acts as a fixed element by the operation of the second brake B2, realizing the forward sixth forward speed and outputting a shifted torque to the output shaft OS connected to the fourth shaft TM4.

The seventh forward speed D7 may be realized with a same gear ratio by four schemes.

In the first scheme of the seventh forward speed D7(1), the first, second, and fourth clutches C1, C2, and C4 are simultaneously operated.

As a result, the input shaft IS and the first shaft TM1 are connected by the operation of the first clutch C1, the fourth shaft TM4 and the sixth shaft TM6 are connected by the operation of the second clutch C2, and the input shaft IS and the second shaft TM2 are connected by the operation of the fourth clutch C4.

As such, the first, second, third and fourth planetary gear sets PG1, PG2, PG3, and PG4 integrally rotate, and a torque is input to the first shaft TM1 and the second shaft TM2, realizing the seventh forward speed where a torque is output as inputted, and outputting a shifted torque to the output shaft OS connected to the fourth shaft TM4.

In the second scheme of the seventh forward speed D7(2), the first, second and third clutches C1, C2, and C3 are simultaneously operated.

As a result, the input shaft IS and the first shaft TM1 are connected by the operation of the first clutch C1, the fourth shaft TM4 and the sixth shaft TM6 are connected by the operation of the second clutch C2, and the input shaft IS and the third shaft TM3 are connected by the operation of the third clutch C3.

As such, the first, second, third and fourth planetary gear sets PG1, PG2, PG3, and PG4 integrally rotate, and a torque is input to the first shaft TM1 and third shaft TM3, realizing the seventh forward speed where a torque is output as inputted, and outputting a shifted torque to the output shaft OS connected to the fourth shaft TM4.

In the third scheme of the seventh forward speed D7(3), the first, third, and fourth clutches C1, C3, and C4 are simultaneously operated.

As a result, the input shaft IS and the first shaft TM1 are connected by the operation of the first clutch C1, the input shaft IS and the third shaft TM3 are connected by the operation of the third clutch C3, and the input shaft IS and the second shaft TM2 are connected by the operation of the fourth clutch C4.

As such, the first, second, third and fourth planetary gear sets PG1, PG2, PG3, and PG4 integrally rotate, and a torque is input to the first shaft TM1, the second shaft TM2, and the third shaft TM3, realizing the seventh forward speed where a torque is output as inputted, and outputting a shifted torque to the output shaft OS connected to the fourth shaft TM4.

In the fourth scheme of the seventh forward speed D7(4), the second, third, and fourth clutches C2, C3, and C4 are simultaneously operated.

As a result, the fourth shaft TM4 and the sixth shaft TM6 are connected by the operation of the second clutch C2, the input shaft IS and the third shaft TM3 are connected by the operation of the third clutch C3, and the input shaft IS and the second shaft TM2 are connected by the operation of the fourth clutch C4.

As such, the first, second, third and fourth planetary gear sets PG1, PG2, PG3, and PG4 integrally rotate, and a torque is input to the second shaft TM2 and the third shaft TM3, realizing the seventh forward speed where a torque is output as inputted, and outputting a shifted torque to the output shaft OS connected to the fourth shaft TM4.

In the eighth forward speed D8, the first and second clutch C1 and C2 and the second brake B2 are simultaneously operated.

As a result, the input shaft IS and the first shaft TM1 are connected by the operation of the first clutch C1, and the fourth shaft TM4 and the sixth shaft TM6 are connected by the operation of the second clutch C2. In the present state, a torque is input to the first shaft TM1.

In such a state, the third shaft TM3 acts as a fixed element by the operation of the second brake B2, realizing the eighth forward speed and outputting a shifted torque to the output shaft OS connected to the fourth shaft TM4.

In the ninth forward speed D9, the first and second clutch C1 and C2 and the first brake B1 are simultaneously operated.

As a result, the input shaft IS and the first shaft TM1 are connected by the operation of the first clutch C1, and the fourth shaft TM4 and the sixth shaft TM6 are connected by the operation of the second clutch C2. In the present state, a torque is input to the first shaft TM1.

In such a state, the second shaft TM2 acts as a fixed element by the operation of the first brake B1, realizing the ninth forward speed and outputting a shifted torque to the output shaft OS connected to the fourth shaft TM4.

In the forward tenth speed D10, the first clutch C1 and the first and second brakes B1 and B2 are simultaneously operated.

As a result, the input shaft IS and the first shaft TM1 are connected by the operation of the first clutch C1. In the present state, a torque is input to the first shaft TM1.

In the above state, the second and third shafts TM2 and TM3 act as fixed elements by the operation of the first and second brakes B1 and B2, realizing the forward tenth speed and outputting a shifted torque to the output shaft OS connected to the fourth shaft TM4.

In the eleventh forward speed D1, the first and fourth clutches C1 and C4 and the first brake B1 are simultaneously operated.

As a result, the input shaft IS and the first shaft TM1 are connected by the operation of the first clutch C1, and the input shaft IS and the second shaft TM2 are connected by the operation of the fourth clutch C4. In the present state, a torque is input to the first and second shafts TM1 and TM2.

In such a state, the second shaft TM2 acts as a fixed element by the operation of the first brake B1, realizing the eleventh forward speed and outputting a shifted torque to the output shaft OS connected to the fourth shaft TM4.

In the twelfth forward speed D12, the second and third clutches C2 and C3 and the second brake B2 are simultaneously operated.

As a result, the fourth shaft TM4 and the sixth shaft TM6 are connected by the operation of the second clutch C2, and the input shaft IS and the third shaft TM3 are connected by the operation of the third clutch C3. In the present state, a torque is input to the third shaft TM3.

In such a state, the third shaft TM3 acts as a fixed element by the operation of the second brake B2, realizing the twelfth forward speed and outputting a shifted torque to the output shaft OS connected to the fourth shaft TM4.

In the reverse first speed REV1, the fourth clutch C4 and the first and third brakes B1 and B3 are simultaneously operated.

As a result, the input shaft IS and the second shaft TM2 are connected by the operation of the fourth clutch C4. In the present state, a torque is input to the second shaft TM2.

In the above state, the second and seventh shafts TM2 and TM7 act as fixed elements by the operation of the first and third brakes B1 and B3, realizing the reverse first speed and outputting a reverse torque through the output shaft OS connected to the fourth shaft TM4.

In the reverse second speed REV2, the second and fourth clutches C2 and C4 and the first brake B1 are simultaneously operated.

As a result, the fourth shaft TM4 and the sixth shaft TM6 are connected by the operation of the second clutch C2, and the input shaft IS and the second shaft TM2 are connected by the operation of the fourth clutch C4. In the present state, a torque is input to the second shaft TM2.

In such a state, the second shaft TM2 acts as a fixed element by the operation of the first brake B1, realizing the reverse second speed and outputting a reverse torque through the output shaft OS connected to the fourth shaft TM4.

Figure 4:
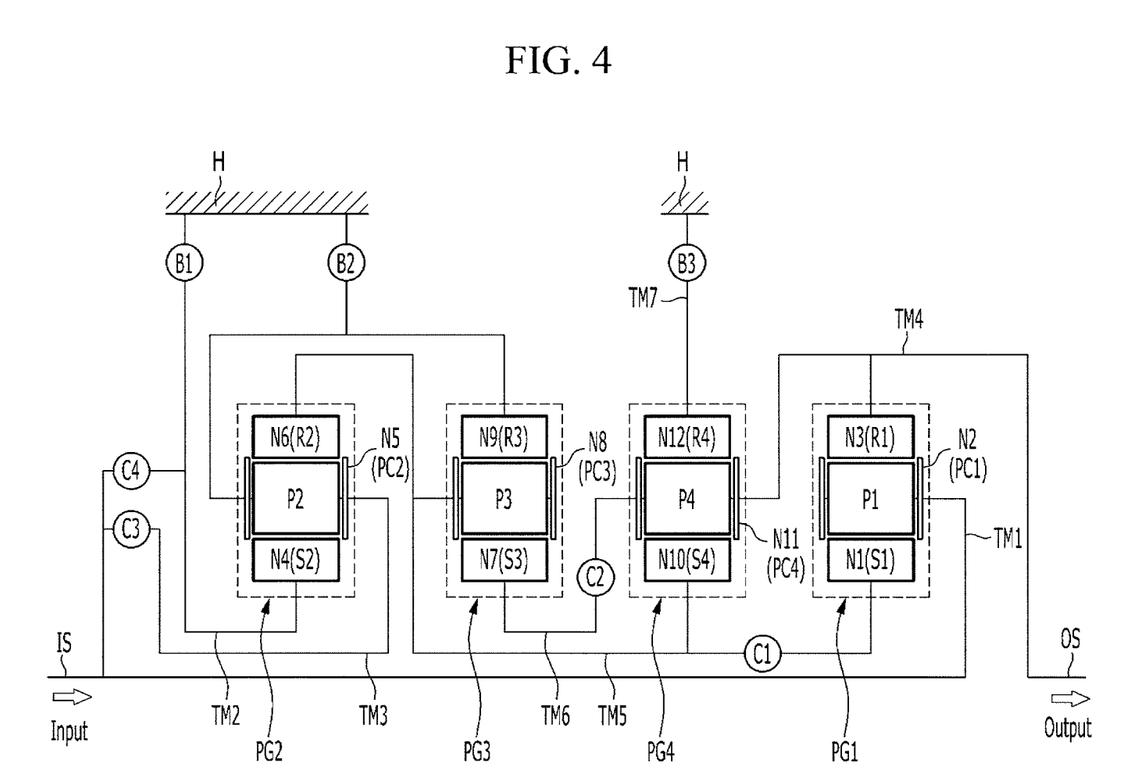
FIG. 4 is a schematic diagram of a planetary gear train according to various exemplary embodiments of the present invention.

FIG. 4 is a schematic diagram of a planetary gear train according to various exemplary embodiments of the present invention.

In the various exemplary embodiments shown in FIG. 1, first clutch C1 is disposed between the input shaft IS and the first shaft TM1 fixedly connected to the second rotation element N2. In the various exemplary embodiments shown in FIG. 4, the first clutch C1 is disposed between the first rotation element N1 and the tenth rotation element N10 among the first, sixth, eighth, and tenth rotation elements N1, N6, N8, and N10 fixedly interconnected by the fifth shaft TM5. The first shaft TM1 is fixedly connected to the input shaft IS.

In the various exemplary embodiments, the first clutch C1 controls delivery of a torque received from the input shaftto is configured to the sixth, eighth, and tenth rotation elements N6, N8, and N10 of the second, third, and fourth planetary gear sets PG2, PG3, and PG4. Such function of the first clutch C1 of the various exemplary embodiments may also be realized by the first clutch C1 of the various exemplary embodiments.

Therefore, although the various exemplary embodiments differs from the various exemplary embodiments in the location of the first clutch C1, the function and operation of the first clutch C1 remains the same.

A planetary gear train according to an exemplary embodiment of the present invention may realize at least ten forward speeds and one reverse speed by controlling four planetary gear sets PG1, PG2, PG3, and PG4 by four clutches C1, C2, C3, and C4 and three brakes B1, B2, and B3.

Furthermore, a planetary gear train according to an exemplary embodiment of the present invention may improve driving stability by realizing shift-stages appropriate for rotation speed of an engine due to multi-stages of an automatic transmission.

Furthermore, a planetary gear train according to an exemplary embodiment of the present invention may maximize engine driving efficiency by multi-stages of an automatic transmission, and may improve power delivery performance and fuel consumption.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures. The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train apparatus of an automatic transmission for a vehicle, comprising:
   an input shaft receiving an engine torque;
   an output shaft outputting a shifted torque;
   a first planetary gear set having a first rotation element, a second rotation element, and a third rotation element;
   a second planetary gear set having a fourth rotation element, a fifth rotation element, and a sixth rotation element;
   a third planetary gear set having a seventh rotation element, an eighth rotation element, and a ninth rotation element;
   a fourth planetary gear set having a tenth rotation element, an eleventh rotation element, and a twelfth rotation element;
   a first shaft fixedly connected to the second rotation element and selectively connectable to the input shaft;
   a second shaft fixedly connected to the fourth rotation element, selectively connectable to the input shaft, and selectively connectable to a transmission housing;
   a third shaft fixedly connected to the fifth rotation element and the ninth rotation element, selectively connectable to the input shaft, and selectively connectable to the transmission housing;
   a fourth shaft fixedly connected to the third rotation element and the eleventh rotation element and fixedly connected to the output shaft;
   a fifth shaft fixedly connected to the first rotation element, the sixth rotation element, the eighth rotation element, and the tenth rotation element;
   a sixth shaft fixedly connected to the seventh rotation element, and selectively connectable to the fourth shaft; and
   a seventh shaft fixedly connected to the twelfth rotation element and selectively connectable to the transmission housing respectively.

2. The planetary gear train apparatus of claim 1, further including:
   four clutches; and
   three brakes selectively connecting the second shaft, the third shaft, and the seventh shaft to the transmission housing respectively.

3. The planetary gear train apparatus of claim 2, wherein the four clutches comprise:
   a first clutch mounted between the input shaft and the first shaft;
   a second clutch mounted between the fourth shaft and the sixth shaft;
   a third clutch mounted between the input shaft and the third shaft; and
   a fourth clutch mounted between the input shaft and the second shaft,
   wherein the three brakes comprise:
   a first brake disposed between the second shaft and the transmission housing;
   a second brake disposed between the third shaft and the transmission housing; and
   a third brake disposed between the seventh shaft and the transmission housing.

4. The planetary gear train apparatus of claim 1, wherein the first planetary gear set is a single pinion planetary gear set having a first sun gear, a first planet carrier, and a first ring gear as the first rotation element, the second rotation element, and the third rotation element,
   the second planetary gear set is a single pinion planetary gear set having a second sun gear, a second planet carrier, and a second ring gear as the fourth rotation element, the fifth rotation element, and the sixth rotation element, the third planetary gear set is a single pinion planetary gear set having a third sun gear, a third planet carrier, and a third ring gear as the seventh rotation element, the eighth rotation element, and the ninth rotation element, the fourth planetary gear set is a single pinion planetary gear set having a fourth sun gear, a fourth planet carrier, and a fourth ring gear as the tenth rotation element, the eleventh rotation element, and the twelfth rotation element.

5. The planetary gear train apparatus of claim 1, wherein the first, second, third and fourth planetary gear sets are disposed in an order of the second, third, fourth, and first planetary gear sets from an engine side thereof.

6. A planetary gear train apparatus of an automatic transmission for a vehicle, comprising:
an input shaft receiving an engine torque;
an output shaft outputting a shifted torque;
a first planetary gear set having a first rotation element, a second rotation element, and a third rotation element;
a second planetary gear set having a fourth rotation element, a fifth rotation element, and a sixth rotation element;
a third planetary gear set having a seventh rotation element, an eighth rotation element, and a ninth rotation element;
a fourth planetary gear set having a tenth rotation element, an eleventh rotation element, and a twelfth rotation element,
wherein the sixth rotation element is fixedly connected to the eighth rotation element and the tenth rotation element,
the third rotation element is fixedly connected to the eleventh rotation element, and fixedly connected to the output shaft,
the fourth rotation element is selectively connectable to the input shaft, and selectively connectable to a transmission housing,
the fifth rotation element is fixedly connected to the ninth rotation element, selectively connectable to the input shaft, and selectively connectable to the transmission housing,
the seventh rotation element is selectively connectable to the eleventh rotation element, and
the twelfth rotation element is selectively connectable to the transmission housing.

7. The planetary gear train apparatus of claim 6, wherein:
the first rotation element is fixedly connected to the sixth rotation element; and
the second rotation element is selectively connectable to the input shaft.

8. The planetary gear train apparatus of claim 7, further including:
four clutches; and
three brakes selectively connecting the fourth rotation element, the fifth rotation element, and the twelfth rotation element to the transmission housing respectively.

9. The planetary gear train apparatus of claim 8, wherein the four clutches comprise:
a first clutch mounted between the input shaft and the second rotation element;
a second clutch mounted between the seventh rotation element and the eleventh rotation element;
a third clutch mounted between the input shaft and the fifth rotation element; and
a fourth clutch mounted between the input shaft and the fourth rotation element,
wherein the three brakes comprise:
a first brake disposed between the fourth rotation element and the transmission housing;
a second brake disposed between the fifth rotation element and the transmission housing; and
a third brake disposed between the twelfth rotation element and the transmission housing.

10. The planetary gear train apparatus of claim 6, wherein the first planetary gear set is a single pinion planetary gear set having a first sun gear, a first planet carrier, and a first ring gear as the first rotation element, the second rotation element, and the third rotation element, the second planetary gear set is a single pinion planetary gear set having a second sun gear, a second planet carrier, and a second ring gear as the fourth rotation element, the fifth rotation element, and the sixth rotation element, the third planetary gear set is a single pinion planetary gear set having a third sun gear, a third planet carrier, and a third ring gear as the seventh rotation element, the eighth rotation element, and the ninth rotation element, the fourth planetary gear set is a single pinion planetary gear set having a fourth sun gear, a fourth planet carrier, and a fourth ring gear as the tenth rotation element, the eleventh rotation element, and the twelfth rotation element.

11. The planetary gear train apparatus of claim 6, wherein the first, second, third and fourth planetary gear sets are disposed in an order of the second, third, fourth, and first planetary gear sets from an engine side thereof.

12. The planetary gear train apparatus of claim 6, wherein:
the first rotation element is selectively connectable to the sixth rotation element; and
the second rotation element is fixedly connected to the input shaft.

13. The planetary gear train apparatus of claim 12, further including:
four clutches; and
three brakes selectively connecting the fourth rotation element, the fifth rotation element, and the twelfth rotation element to the transmission housing respectively.

14. The planetary gear train apparatus of claim 13, wherein the four clutches comprise:
a first clutch mounted between the first rotation element and the tenth rotation element;
a second clutch mounted between the seventh rotation element and the eleventh rotation element;
a third clutch mounted between the input shaft and the fifth rotation element; and
a fourth clutch mounted between the input shaft and the fourth rotation element,
wherein the three brakes comprise:
a first brake disposed between the fourth rotation element and the transmission housing;
a second brake disposed between the fifth rotation element and the transmission housing; and
a third brake disposed between the twelfth rotation element and the transmission housing.

15. A planetary gear train apparatus of an automatic transmission for a vehicle, comprising:
an input shaft receiving an engine torque;
an output shaft outputting a shifted torque;

a first planetary gear set having a first rotation element, a second rotation element, and a third rotation element;

a second planetary gear set having a fourth rotation element, a fifth rotation element, and a sixth rotation element;

a third planetary gear set having a seventh rotation element, an eighth rotation element, and a ninth rotation element;

a fourth planetary gear set having a tenth rotation element, an eleventh rotation element, and a twelfth rotation element;

a first shaft fixedly connected to the second rotation element and fixedly connected to the input shaft;

a second shaft fixedly connected to the fourth rotation element, selectively connectable to the input shaft, and selectively connectable to a transmission housing;

a third shaft fixedly connected to the fifth rotation element and the ninth rotation element, selectively connectable to the input shaft, and selectively connectable to the transmission housing;

a fourth shaft fixedly connected to the third rotation element and the eleventh rotation element and fixedly connected to the output shaft;

a fifth shaft selectively connected to the first rotation element and fixedly connected to the sixth rotation element, the eighth rotation element, and the tenth rotation element;

a sixth shaft fixedly connected to the seventh rotation element, and selectively connectable to the fourth shaft; and a seventh shaft fixedly connected to the twelfth rotation element and selectively connectable to the transmission housing respectively.

16. The planetary gear train apparatus of claim 15, further including:

four clutches; and three brakes selectively connecting the second shaft, the third shaft, and the seventh shaft to the transmission housing respectively.

17. The planetary gear train apparatus of claim 16, wherein the four clutches comprise:

a first clutch mounted between the first rotation element and the tenth rotation element;

a second clutch mounted between the fourth shaft and the sixth shaft;

a third clutch mounted between the input shaft and the third shaft; and a fourth clutch mounted between the input shaft and the second shaft, wherein the three brakes comprise:

a first brake disposed between the second shaft and the transmission housing;

a second brake disposed between the third shaft and the transmission housing; and a third brake disposed between the seventh shaft and the transmission housing.

18. The planetary gear train apparatus of claim 15, wherein the first planetary gear set is a single pinion planetary gear set having a first sun gear, a first planet carrier, and a first ring gear as the first rotation element, the second rotation element, and the third rotation element, the second planetary gear set is a single pinion planetary gear set having a second sun gear, a second planet carrier, and a second ring gear as the fourth rotation element, the fifth rotation element, and the sixth rotation element, the third planetary gear set is a single pinion planetary gear set having a third sun gear, a third planet carrier, and a third ring gear as the seventh rotation element, the eighth rotation element, and the ninth rotation element, the fourth planetary gear set is a single pinion planetary gear set having a fourth sun gear, a fourth planet carrier, and a fourth ring gear as the tenth rotation element, the eleventh rotation element, and the twelfth rotation element.

* * * * *